United States Patent
Sieh et al.

(10) Patent No.: US 7,443,174 B2
(45) Date of Patent: Oct. 28, 2008

(54) ELECTRIC FIELD RECIPROCAL DISPLACEMENT SENSORS

(75) Inventors: Philip J. Sieh, Chandler, AZ (US); William D. McWhorter, Phoenix, AZ (US); Bradley C. Stewart, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 350 days.

(21) Appl. No.: 11/400,160

(22) Filed: Apr. 6, 2006

(65) Prior Publication Data

US 2007/0235272 A1   Oct. 11, 2007

(51) Int. Cl.
*G01R 27/26* (2006.01)

(52) U.S. Cl. ............... 324/662; 324/660; 324/661

(58) Field of Classification Search ........... 324/660, 324/661, 662
See application file for complete search history.

(56) References Cited

U.S. PATENT DOCUMENTS

| 4,788,489 | A | * | 11/1988 | Kobayashi et al. ......... 324/660 |
| 5,125,681 | A | * | 6/1992 | Brackette, Jr. ........ 280/124.101 |
| 6,788,220 | B2 | | 9/2004 | Netzer |
| 7,141,988 | B2 | * | 11/2006 | Chertok .................... 324/661 |
| 2004/0124999 | A1 | | 7/2004 | Kim |
| 2006/0066319 | A1 | * | 3/2006 | Dallenbach et al. ........ 324/662 |

* cited by examiner

*Primary Examiner*—Diego Gutierrez
*Assistant Examiner*—John Zhu
(74) *Attorney, Agent, or Firm*—Ingrassia, Fisher & Lorenz, P.C.

(57) ABSTRACT

"Electrical field ("E-field") sensor systems that sense displacement or change in displacement of one body relative to another." In general, the bodies 110, 112 are within an electrical field and displacement of a body causes a change in the E-field. A field sensor 290 detects this change and a processor 275 translates it to a change in position of the displaced body 110. The E-fields are generated by electrodes (or an electrode and a ground member) that generate the E-field. The systems include detectors 240 that detect changes in the E-field, such as capacitance, and transmit these to the processor 275.

12 Claims, 4 Drawing Sheets

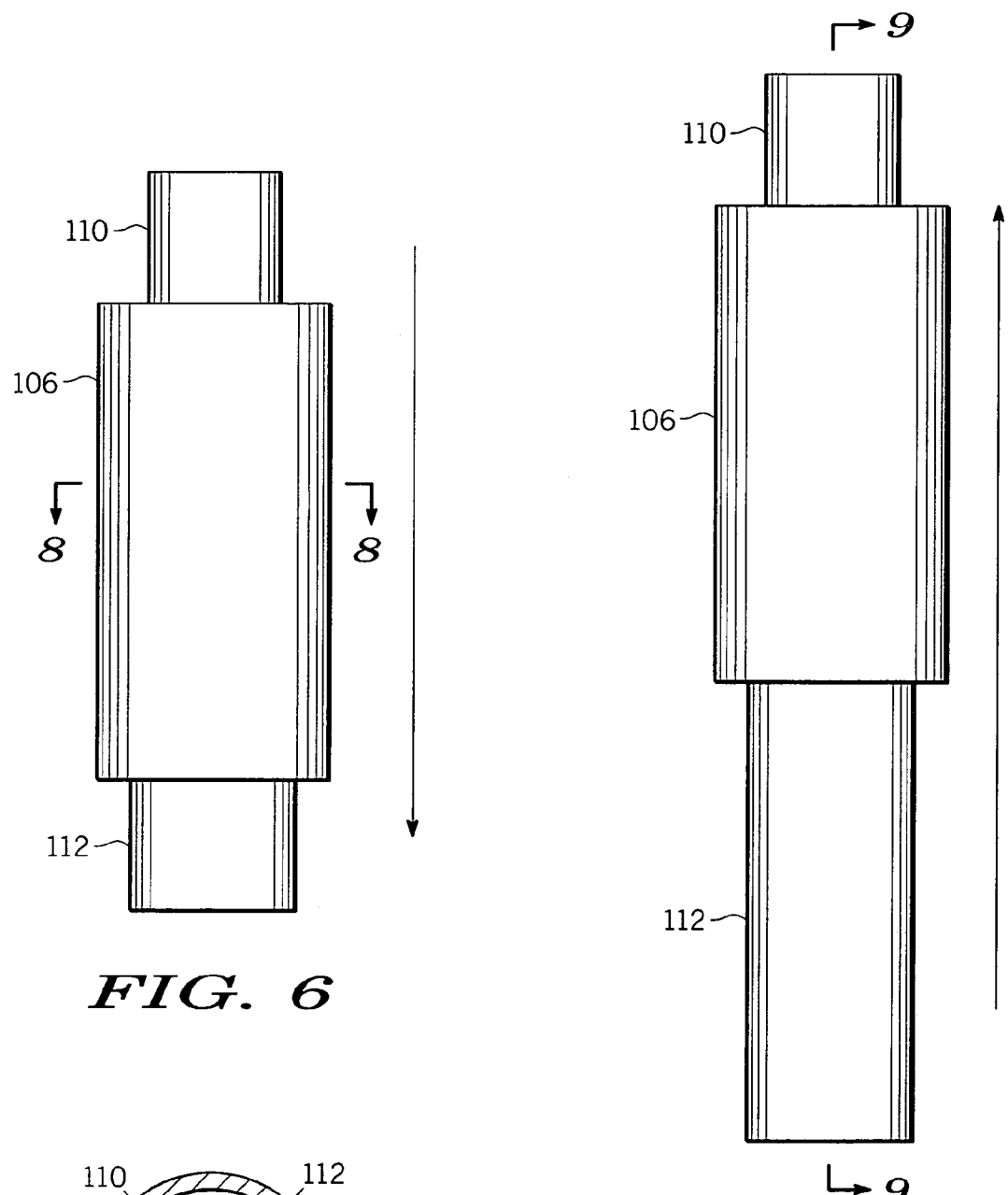
FIG. 6
FIG. 7
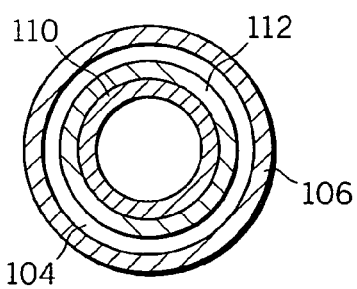
FIG. 8

ELECTRIC FIELD RECIPROCAL DISPLACEMENT SENSORS

TECHNICAL FIELD

The present invention relates generally to systems and devices for measuring displacement of one body relative to another. More particularly, the present invention relates to sensing changes in an electrical field to determine displacement of one body to another body, for example as in reciprocating motion.

BACKGROUND

In the mechanical arts it is fairly common to find devices with a pair of nested members that reciprocate in ordinary use. For example, in the automotive industry, shock absorbers reciprocate and dampen transmitted shocks, and in the bicycle industry, forks are sometimes fitted with shock absorbers on certain types of bikes. In general, these shock absorbers have an outer cylindrical tube within which an inner tube is nested. The outer tube is usually stationary, and the inner tube reciprocates in the outer tube.

Recently, there have been several advances in the shock absorber area, especially as applied to vehicles. For example, the development of electro-rheological fluid-filled shock absorbers. These fluids are liquids filled with magnetic particles that line up in an applied magnetic field so that the liquid transforms instantaneously to a gel. The degree of gelling depends upon applied magnetic field strength, and that in turn depends upon the strength of the applied current to the electro-magnet generating the field. The change of form from a liquid to a gel permits better absorption of shocks and dampens out perturbations such as those encountered when the vehicle is driven on ordinary roads with common irregularities. These shock absorbers may also assist in high speed maneuvers by minimizing vehicular body sway. The extent to which an electro-rheological fluid gels depends upon the current applied, and the amount of current applied depends on the extent to which the shock absorber is reciprocated or displaced from a rest position. Thus, typically the farther the reciprocating action displaces the shock absorbers, the higher the applied current to counter the displacement forces, and the more resistant the gel becomes to counteract the forces. Since applying current is dependent upon displacement of the shock absorber inner tube from a rest position, it may be necessary or desirable for these systems for a controller of magnetic field strength to know the position of the inner tube relative to the outer tube instantaneously.

Accordingly, it is desirable to develop a system that determines in real time the position of reciprocating members relative to each other to facilitate improvements in a variety of mechanical systems. It is further desirable that the system generate a control signal for appropriate action. In addition, it is desirable that the system be robust and easily fitted to reciprocating members without otherwise interfering with operation of the members. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present disclosure may be derived by referring to the detailed description and claims when considered in conjunction with the following figures. The figures are schematic, may contain concept elements for illustrative purposes that are not physically present, and are not to scale. In the figures, like reference numbers refer to similar elements. In this disclosure, the figures are representational and include information that is not physically present, such as conceptual capacitor 210 which is shown in broken lines to illustrate a principle.

FIG. 6 is a side view of another embodiment of the present disclosure with the inner tube reciprocating into the outer tube that has a surrounding sleeve;

FIG. 7 is a side view of the embodiment of FIG. 6 with the inner tube reciprocating out of the outer tube;

FIG. 8 is a schematic longitudinal cross sectional side view of the embodiment of FIG. 6;

DETAILED DESCRIPTION

Figure 1:
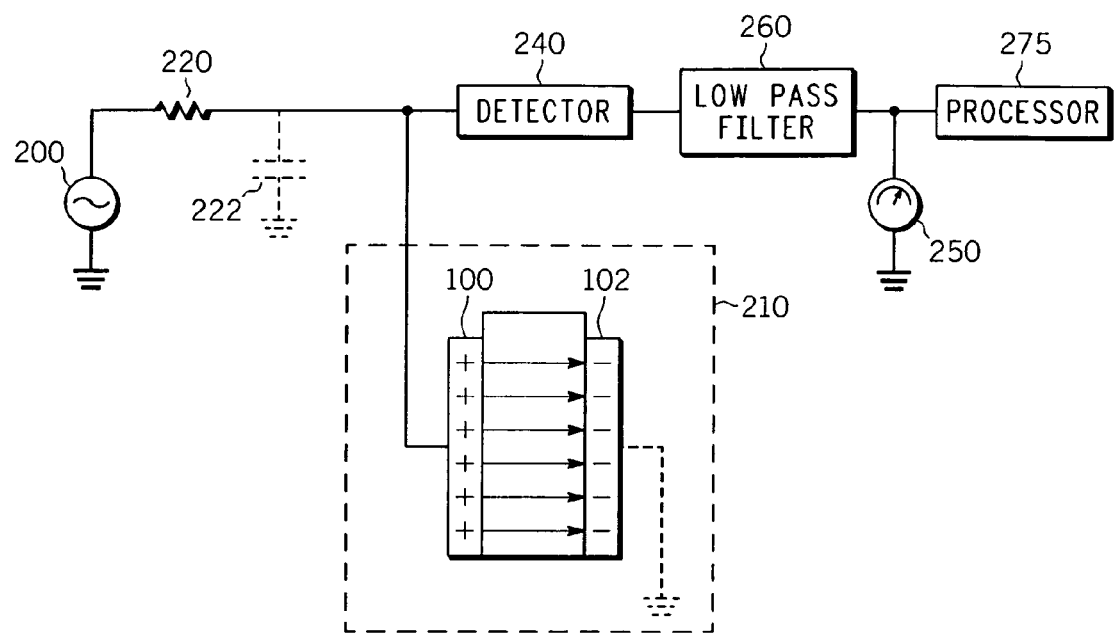
FIG. 1 is a schematic of an electrical field sensor depicting concepts of the present disclosure.

The following detailed description is merely illustrative in nature and is not intended to limit the present disclosure. Furthermore, there is no intention to be bound by any expressed or implied theory presented in the preceding technical field, background, brief summary or the following detailed description.

The present disclosure may use terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the technology of the present disclosure may be practiced in conjunction with any number of data transmission protocols and that the system described herein is merely one exemplary application.

The present disclosure provides electrical field ("E-field") sensor systems that sense displacement or change in displacement of one member relative to another. In general, the members are within or create an electrical field, and displacement of a member causes a change in the E-field. A field sensor that may be an integrated circuit detects this change and a configured processor translates the detected change to a change in a quantitative measure of a member being monitored.

The E-field systems of the present disclosure will find wide ranging applications. For example, in the automotive industry in shock absorbers, and in the cycling industry bicycle forks, and in the aircraft industry where extent of movement of a mechanical component must be measured.

In order to better appreciate the technology of the present disclosure, consider that the object to be detected forms a capacitor to a virtual ground. Thus, a model of the capacitor includes a pair of spaced-apart opposite electrodes (or an electrode and a ground plate). A detection volume is formed between the electrodes (or an electrode and a ground plate). The object to be measured is located in the detection volume. Accordingly, the following equation applies:

$$C=[k\epsilon_0 A/d]$$

where C is measured capacitance, k is a dielectric constant of member to be detected, d is a distance between the members (e.g. radial distance the tubes are apart), $\epsilon_0$ is the permittivity constant (for free space=$8.854 \times 10^{-12}$ Farad/meter$^2$), and A is the affected electrode surface area.

If, for example, the object to be measured is a solid body, like a metal tube, within an E-field, then: k is known from the physical properties of the tube, $\epsilon_0$ is the permittivity of free space, and d is a characteristic displacement dimension of the tube, which relates to the affected area A. The affected area A is an area that will vary as the tube moves in the E-field. Thus capacitance reflects and may be used to detect those tube movements within an E-field that change the affected area A. A change in measured capacitance C is proportional to a change in A. So, capacitance correlates to area A, and area A correlates to displacement d.

FIG. 1 provides a schematic of some of the concepts involved in systems of the present disclosure that use E-field perturbation as a basis for quantitative determination. The system depicts a simple E-field sensor array, and is merely exemplary. Other types of sensing systems may also be used according to the present disclosure. In the conceptual diagram of FIG. 1, the circuit of interest includes an electrode 100, for example any one of the electrodes shown in other FIGS herein, with either an opposite electrode 102 or a ground plate 102. (Of course, the "ground plate" may be of any shape that is grounded, and the term "plate" here does not limit the ground to a planar or other "plate" shape.) The circuit also has a signal generator 200, for example a 120 KHz sine wave generator; a load resistor 220, for example a 22 K Ohm resistor (with optional ground 222); a detector 240; low pass filter 260; a processor 275, for example any suitable processor that can be configured to perform necessary calculations; and an indicator 280. The electrode 100 and opposed electrode or ground plate 102 together with material between these in the detection volume form a "conceptual capacitor" 210. The capacitance of capacitor 210 varies with changes within the detection volume. A signal generated will be altered by any changes at the electrode 110. Thus, the detector 240 in this example monitors the amplitude of a sine wave from signal generator 200 and is able to detect changes. The low pass filter 260 removes any extraneous AC frequency components from the incoming signal. Signals may be converted to digital inputs suitable for a digital signal processor. The processor 275 calculates a quantitative measure of the detection volume, for example, a measure relating to a solid body within the detection volume. An indicator 250 may display information about the body to be measured detected, and may generate an alert.

From FIG. 1 it is apparent that if the area of electrode 100 is reduced from $A_x$ to $A_y$, then the variable "A" in the capacitive equation is reduced to $A_y$ as well. Accordingly, the system may be used to monitor changes in the area of an electrode in the virtual capacitor 210 generating the E-field, all other factors being equal, by measuring capacitance variation. Depending upon electrode geometry, the length or other dimension of the electrode that is changing while it is generating the E-field may be calculated from the measured changes in capacitance.

Figure 2:
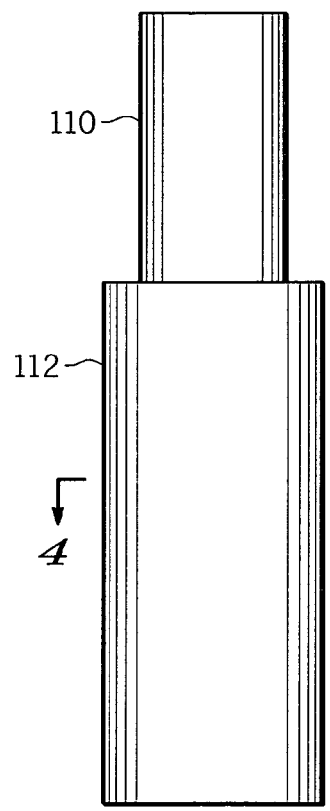
FIG. 2 is a side view of an embodiment of the present disclosure with the inner tube reciprocating into the outer tube.
Figure 3:
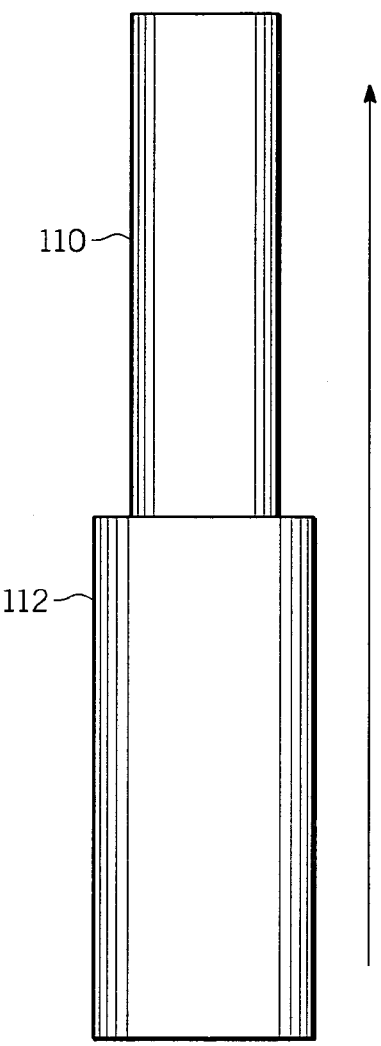
FIG. 3 is a side view of an embodiment of the present disclosure with the inner tube reciprocating out of the outer tube.
Figure 4:
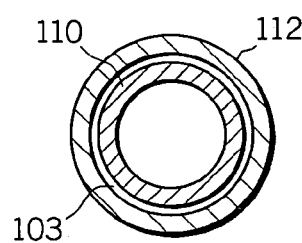
FIG. 4 is a cross sectional view of the embodiments of FIGS. 2 and 3.
Figure 9:
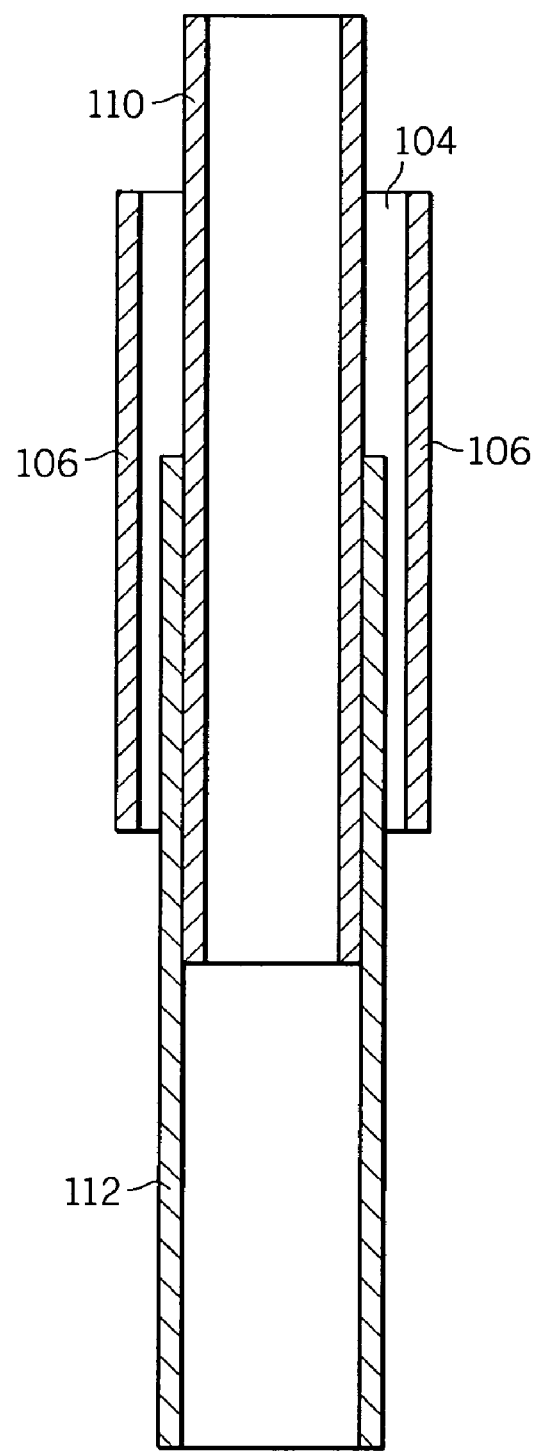
FIG. 9 is a schematic lateral cross sectional view of the embodiment of FIG. 6.

FIGS. 2-4 depict side and cross sectional views of a "tube-within-tube" structure, as commonly encountered in the mechanical arts, for example in shock absorbers. Of course, the present disclosure is not restricted to tubes or objects with cylindrical outer surfaces but includes any two members that are structured so that one nests within the other and is able to reciprocate relative to the other. The shock absorber will be used as a non limiting illustrative example in the present disclosure. Here, inner tube 110 nests within and reciprocates within outer tube 112, as can be seen from FIGS. 2-3 where the arrow depicts direction of motion. Further, FIG. 4 shows a separation 103 between the inner tube 110 and the outer tube 112, so that they are electrically isolated from each other. That separation may be achieved in a variety of ways. For example, by a non-conductive bushing (not shown) inserted between the tubes, or the tubes may be separated by an intervening low friction durable sleeve such as a nylon sleeve (not shown), or the inner tube may have an outer coating of non-conductive material (not shown), or the outer tube may have an inner coating of non-conductive material (not shown). Other methods of isolation are also useful.

Figure 5:
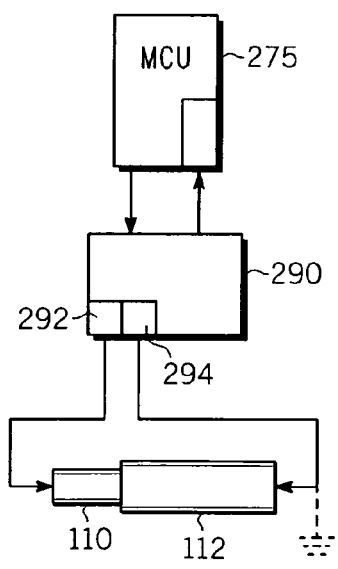
FIG. 5 is a block diagram depicting the embodiment of FIGS. 2-4 connected to a sensor system, in accordance with the present disclosure.

FIG. 5 is a block diagram depicting the device of FIGS. 2-4 connected to a field sensor 290, and a processor 275. In the illustrated example, inner tube 110 is connected to a first electrode input 292 so that it is effectively the first electrode from an electrical standpoint. Outer tube 112 is either grounded (shown in dashed lines) or connected to a second electrode input 294, so that the outer tube is effectively the second electrode. Thus, an E-field is formed between the two electrodes (tubes 110, 112). Alternatively, the E-field is created between inner tube 110 and ground, if the outer tube 112 is grounded. Accordingly, as explained above, the tubes 110, 112 and the detection volume between may be regarded as a virtual capacitor 210.

When inner tube 110 is inserted into the outer tube 112 in a first position as in FIG. 2, the affected outer surface area of the first electrode is $A_1$, which is the outside area of tube 110 that is within the outer tube and facing the inner surface of the outer tube. When the inner tube 110 reciprocates out of the outer tube 112 to a second position, as in FIG. 3, the affected outside surface area of the inner tube that is inside the outer tube is $A_2$. $A_2$ is less than $A_1$. Accordingly, it might be expected that a measured capacitance is higher at the first position than the second position. Indeed, a relationship between capacitance C and the extent to which inner tube 110 is inserted into outer tube 112 may be readily developed. Since the tube outer surface has known geometry, the affected area A may be correlated to a length dimension of the inner tube 110.

FIGS. 6-9 depict another embodiment of the present disclosure. In this embodiment, inner tube 110 is in electrical contact with outer tube 112. However, outer tube 112 is surrounded at least partially with a coating 104 of a material that is not electrically conductive. Coating materials may be selected from any suitable non-conducting polymers, and the like. The coating 104 is in turn covered at least partially with a conductive layer such as sleeve 106. The conductive layer may be, for example, of a conductive metal such as copper, aluminum, and the like. The sleeve 106 is preferably located so that its area will cover the section of the tube combination within which the inner tube 110 reciprocates. So, the measured capacitance of the system should vary as the inner tube 110 reciprocates and the proportion of the inner tube 110 in the detection volume varies.

Figure 10:
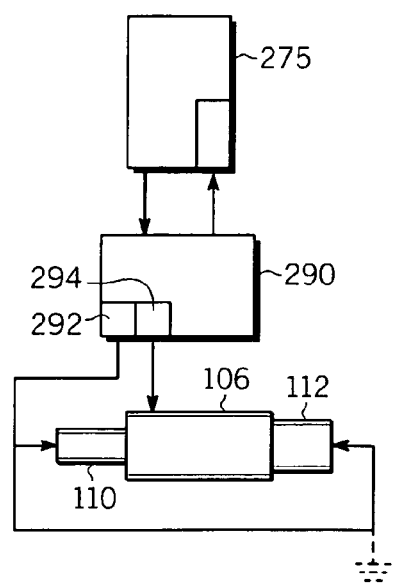
FIG. 10 is a block diagram depicting the embodiment of FIGS. 6-9 connected to a sensor system, in accordance with the present disclosure.

FIG. 10 depicts schematically an E-field sensor system including the embodiment of FIGS. 6-9. Here, sleeve 106 is in communication with an electric field sensor 290, which is in turn coupled to a processor 275. As shown, either the inner tube 110, or the outer tube 112, or both may be electrically coupled to a single electrode input 292 to the sensor 290 since the two together form a single electrode. The outer sleeve 106 is coupled to the other electrode input 294 of sensor 290 and forms an effective second electrode. As a result, the space between the sleeve 106 and the inner and outer tubes 110, 112 is a detection volume within an E-field.

The system detects movement of the inner tube 110 through a change in measured capacitance C. There are a variety of techniques for correlating measured capacitance to the displacement of the inner tube 110. For example, a test run may be set up to measure displacement of the tube versus measured capacitance and this information may be stored as a look up table or a polynomial or in any form suitable for the processor, as configured, to access and use.

In one embodiment, the present disclosure provides an electric field sensor system that has a first member including an electrode adapted for creating an electric field in an area within a detection volume where body displacement is to be detected; and a second member including a ground member or a second electrode. An electrical field sensor is communicatively coupled to the first electrode, and is configured to generate a detected signal responsive to a change in the electric field. A processor is coupled to the field sensor and is configured to determine a displacement measure of a member within the detection volume from the detected signal in accordance with a capacitive relationship between the first electrode, the detection volume and member physical properties. The first member of the system may have an inner tube adapted to reciprocate within the second member that includes an outer tube where the inner and outer tubes are electrically isolated from each other. The inner and outer tubes may comprise reciprocating components of a shock absorber.

The members for displacement measurement of the system may also include an inner tube and an outer tube, where the inner tube is adapted to reciprocate within the outer tube. Further, in this case, the inner and outer tubes are in electrical contact with each other. In this embodiment of the system, the first electrode may include an electrically conductive sleeve that at least partially surrounds the outer tube and that is electrically isolated from the outer tube. The sleeve is in communication with the field sensor. The inner and outer tubes may be reciprocating components of a shock absorber.

The one embodiment may be configured for a capacitive relationship that includes:

$$C=[k\epsilon_0 A/d]$$

where C is detected capacitance, k is a dielectric constant of an object to be detected, $\epsilon_0$ is the permittivity of free space, and A is an electrode surface area, and d is a characteristic displacement dimension.

The field sensor of the system may include an analog signal generator, an analog signal detector, and a digital converter receiving input from the detector, the converter supplying digital output as input to the processor. The field sensor may comprise an integrated circuit.

In another embodiment, the present disclosure provides an electric field sensor system including a first electrode comprising a first member that is adapted for creating an electric field in an area within a detection volume where body displacement is to be detected; and a ground plate or a second electrode comprising a second member, where the first and the second members are in reciprocating relationship. Further, the system includes an electrical field sensor communicatively coupled to the first electrode and configured to generate a detected signal responsive to a change in the electric field. A processor is coupled to the field sensor and is configured to determine a displacement measure of the two members relative to each other within the detection volume from the detected signal in accordance with a capacitive relationship between the first electrode, the detection volume and body physical properties.

The first electrode may include an inner tube and the second electrode or ground member may include an outer tube. The inner and outer tubes are electrically isolated from each other and the inner tube reciprocates within the outer tube.

Alternatively, the first electrode may include an outer tube and the second electrode or ground member may include an inner tube. The inner and outer tubes are electrically isolated from each other and the inner tube reciprocates within the outer tube.

In another embodiment, the present disclosure provides an electric field sensor system including a first electrode adapted for creating an electric field in an area within a detection volume where reciprocating displacement is to be detected; and a ground member or a second electrode. It also includes an electrical field sensor communicatively coupled to the first electrode that is configured to generate a detected signal responsive to a change in the electric field. A processor is coupled to the field sensor and configured to determine a displacement measure of reciprocating tubes relative to each other within the detection volume from the detected signal, in accordance with a capacitive relationship between the first electrode, the detection volume and tube physical properties The displacement measurement may include a measure of reciprocation of an inner member nested within an outer member where the inner and outer members are in electrical contact with each other.

The first electrode may include an electrically conductive sleeve at least partially surrounding the outer member and electrically isolated from the outer member that is also in communication with the field sensor. The second electrode or ground member may include the inner member.

Alternatively, the second electrode or ground member may include an electrically conductive sleeve at least partially surrounding the outer member that is electrically isolated from the outer member and in communication with the field sensor. The first electrode comprises the inner member. The first electrode may be either an inner member or an outer member.

The displacement measurement may include a measure of reciprocation of the inner member within the outer member where the two members are isolated from each other.

While at least one example embodiment of an electrical field sensor system has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An electric field sensor system, comprising:
a first member comprising a first electrode adapted for creating an electric field within a detection volume where displacement is to be detected;
a second member, comprising:
an inner tube; and
an outer tube, the inner tube adapted to reciprocate within the outer tube, the inner and outer tubes in electrical contact with each other;
an electrical field sensor communicatively coupled to the first electrode, the electrical field sensor configured to generate a detected signal responsive to a change in the electric field; and
a processor coupled to the field sensor, the processor configured to determine a displacement measure of a member from the detected signal in accordance with a capacitive relationship between the first electrode and body physical properties;
wherein the first member further comprises an electrically conductive sleeve at least partially surrounding the outer tube and electrically isolated from the outer tube, the sleeve in communication with the field sensor.

2. The system of claim 1, wherein the inner and outer tubes comprise reciprocating components of a shock absorber.

3. The system of claim 1, wherein the capacitive relationship comprises:

$$C = [k\epsilon_0 A/d]$$

where C is detected capacitance, k is a dielectric constant of an object to be detected, $\epsilon_0$ is the permittivity of free space, A is a electrode affected surface area, and d is a characteristic displacement dimension.

4. The system of claim 1, wherein the field sensor further comprises an analog signal generator, an analog signal detector, and a digital converter receiving input from the detector, the converter supplying digital output as input to the processor.

5. The system of claim 1, wherein the field sensor comprises an integrated circuit.

6. . An electric field sensor system comprising:
a first electrode comprising a first member adapted for creating an electric field in an area within a detection volume where member displacement is to be detected;
a ground plate or a second electrode comprising a second member, the first and the second members in reciprocating relationship;
an electrical field sensor communicatively coupled to the first electrode, the electrical field sensor configured to generate a detected signal responsive to a change in the electric field; and
a processor coupled to the field sensor, the processor configured to determine a displacement measure of the two members relative to each other within the detection volume from the detected signal in accordance with a capacitive relationship between the first electrode, the detection volume and body physical properties;
wherein the displacement measurement comprises a measure of reciprocation of an inner member nested within an outer member, the inner and outer members in electrical contact with each other.

7. The system of claim 6, wherein the capacitive relationship comprises:

$$C = [k\epsilon_0 A/d]$$

where C is detected capacitance, k is a dielectric constant of an object to be detected, $\epsilon_0$ is the permittivity of free space, A is an electrode surface area, and d is a characteristic displacement dimension.

8. The system of claim 6, wherein the field sensor further comprises an analog signal generator, an analog signal detector, and a digital converter receiving input from the detector, the converter supplying digital output as input to the processor.

9. The system of claim 6, wherein the field sensor comprises an integrated circuit.

10. An electric field sensor system, comprising:
a first electrode adapted for creating an electric field in an area within a detection volume where reciprocating displacement is to be detected;
a ground member or a second electrode;
an electrical field sensor communicatively coupled to the first electrode, the electrical field sensor configured to generate a detected signal responsive to a change in the electric field; and
a processor coupled to the field sensor, the processor configured to determine a displacement measure of reciprocating members relative to each other within the detection volume from the detected signal in accordance with a capacitive relationship between the first electrode, the detection volume and tube physical properties;
wherein the displacement measurement comprises a measure of reciprocation of an inner member nested within an outer member, the inner and outer members in electrical contact with each other.

11. The system of claim 10, wherein the first electrode comprises an electrically conductive sleeve at least partially surrounding the outer member and electrically isolated from the outer member, the sleeve in communication with the field sensor.

12. The system of claim 10, wherein the second electrode or ground member comprises an electrically conductive sleeve at least partially surrounding the outer member and electrically isolated from the outer member, the sleeve in communication with the field sensor, and the first electrode comprises the inner member.

* * * * *